Jan. 30, 1923.
S. TOMMASELLO.
THERMOSTATIC CIRCUIT CLOSER.
FILED NOV. 10, 1919.
1,443,395
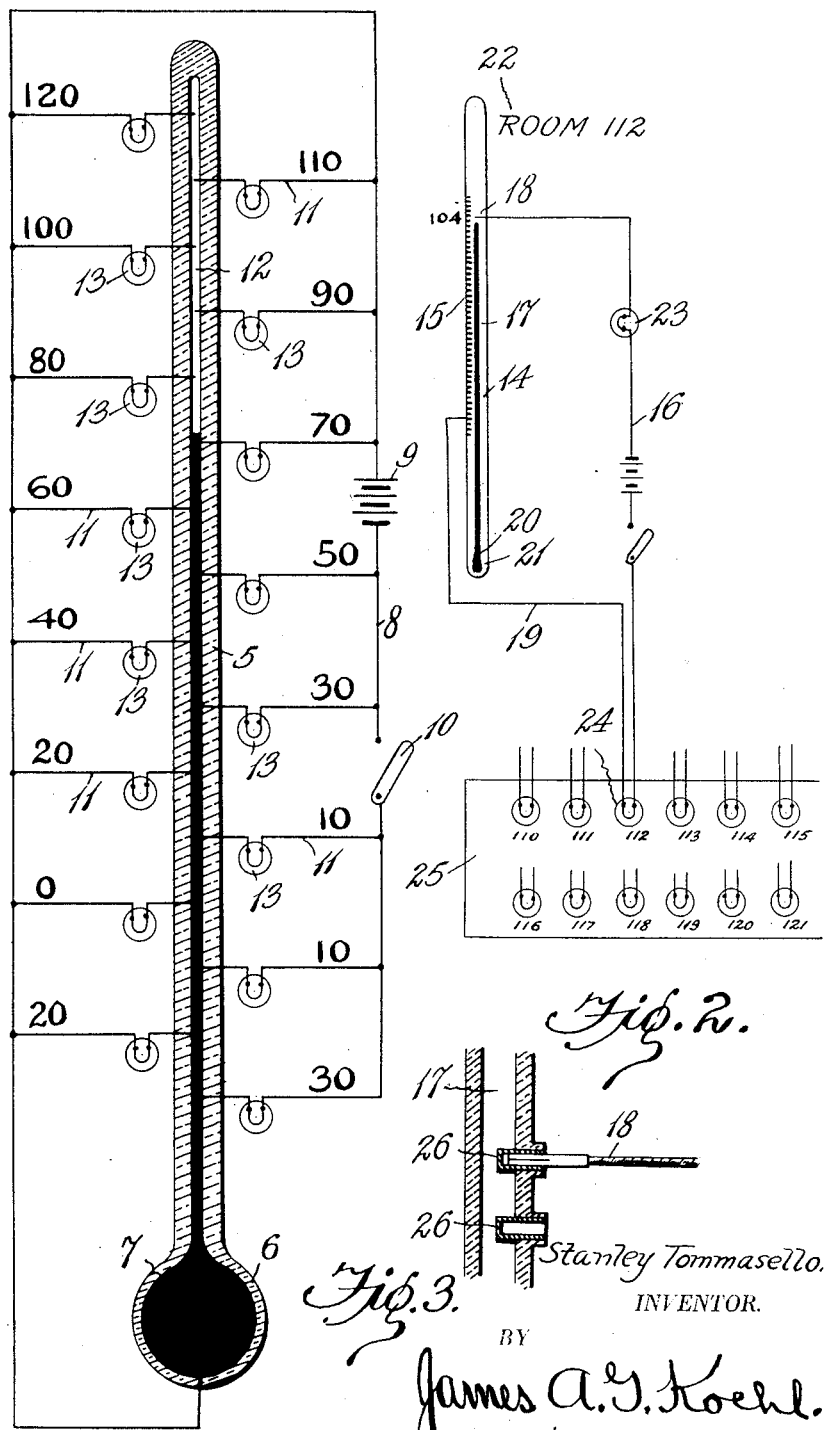
Stanley Tommasello,
INVENTOR.
BY
James A. J. Koehl.
ATTORNEY.

Patented Jan. 30, 1923.                                                1,443,395

UNITED STATES PATENT OFFICE.

STANLEY TOMMASELLO, OF BROOKLYN, NEW YORK.

THERMOSTATIC CIRCUIT CLOSER.

Application filed November 10, 1919. Serial No. 337,012.

*To all whom it may concern:*

Be it known that I, STANLEY TOMMASELLO, citizen of the United States, and resident of Brooklyn, in the county of Kings and State of New York, have invented certain new and useful Thermostatic Circuit Closers, of which the following is a specification.

This invention relates to mechanism for conveying thermometrical readings.

The invention is particularly designed for use in connection with thermometers generally, wherein the temperature is ordinarily determined by reading the position of the liquid column in the capillary stem or tube, the latter having a scale of conventional degrees co-acting with said liquid.

It is an object of the invention to provide electrically controlled means adapted to be arranged in circuit with the mercury of a thermometer and including circuit completing leads, agreeing in position with the scale graduations of the instrument, the circuit including devices for tracing the successive positions of the mercurial column and for establishing greater and more effective visualization of the readings by causing lamps to be lighted or other devices to be controlled to prominently and conspicuously display the exact thermal state of the instrument, rendering it unnecessary for the observer to cast his eyes upon the scale and mercurial column when definite readings are desired.

A still further object of the invention is to provide, in combination with a mercurial thermometer, a system whereby the readings of the instrument can be accurately conveyed to a distant point, having in mind, a clinical thermometer for use in hospitals or like places and an automatic conveying of the readings from a sick room to the doctor's office.

A more specific object of the invention is to provide a new and useful combination of devices which will include an information board having lamps or indicating mechanisms, respectively distinguished from each other and each agreeing with a numbered or suitably designated room of a hospital and with a corresponding thermometer so that when the temperature of a patient in some particular room reaches a predetermined degree, information of such condition will be conducted to said information board, enabling the doctor in attendance to conduct such rounds as the urgency requires and preventing the creation of articulate sound in the sick room in an effort to convey such information.

The various important features will be particularly pointed out hereinafter in connection with a detailed description of a number of embodiments of my invention which I have selected for illustration in the accompanying drawings, in which similar reference characters indicate corresponding parts in the several views.

In the drawings:

Figure 1 is a diagrammatic illustration of the invention, with parts in section.

Figure 2 is a diagrammatic illustration showing a slightly modified form of the invention.

Figure 3 is a detail section through a portion of the tube.

In Figure 1 of the drawings I have shown a thermometer in which the temperature is determined by reading the position of the end of the mercury column in the stem or tube, the latter having a scale of conventional degrees. The capillary stem or tube 5 carries a bulb 6, containing mercury 7. The degrees are distinguished in the customary manner by numbers. The degrees as numbered herein are in the multiples of "ten" but it will of course be understood that intermediate fractions may be included if desired.

An electric circuit is illustrated at 8, the same including a battery 9 and a hand actuated switch 10 so that the circuit can be opened or closed as required. Leads 11 of the circuit are terminally extended into the thread channel 12 of the stem or tube 5, said leads agreeing with the positions of the degree numbers and each having an incandescent lamp 13. From this construction, it will be seen that the terminals of said leads are exposed for effective circuit closing contact with the mercury as the latter rises in the channel 12, thereby closing the circuit and causing the lamps 13 to be lighted. As said lamps are arranged in agreement with the scale numbers of the thermometer, it may be desirable to imprint such numbers directly upon the lamps, but this is not entirely necessary in that said lamps may be arranged in immediate proximity with said numbers. This arrangement may be desirable where the numbers are not embodied as part of the scale surface.

In Figure 2, a clinical thermometer 14 is illustrated, the same having a scale surface 15 of ordinary design. Embodied in this form is an electric circuit 16 having one of its leads extending into the thread channel of the stem or tube 17, as shown at 18, and the second lead 19 makes connection with the mercury 20 adjacent or through the bulb 21. The mechanism shown in this form of my invention is intended for use primarily in hospitals and for the purpose of conveying a clear understanding, of its purpose and operation, it is illustrated as bearing a distinguishing mark 22 which I will hereinafter designate "Room 112." In the circuit 16 and positioned at a suitable point in the room is an incandescent lamp 23 which corresponds with a similar lamp 24 on an information board 25.

The lamp 24 on said board 25 is also arranged in the circuit 16 and the same is remotely positioned with relation to said lamp 23 whereby thermometrical readings may be simultaneously transmitted to both of said lamps when the mercury makes contact with the effective circuit closing lead 18. The lamp 24 bears a distinguishing number conforming with the mark or number of the thermometer from which the readings are received. The board 25 may be located in the office of the attending physician of the hospital in which the mechanism is employed, and it can be provided with as many lamps as there are rooms in which patients are confined, thus enabling the physician to ascertan at a glance, the temperature of each patient as often as the temperature of the patient is taken by the nurse in charge. The arrangement is such that in cases of serious sickness, where the temperature of the patient becomes abnormal, information of such fact will be instantly transmitted to the board 25 where the physician will be able to make such visits as the urgency demands. The construction also permits of the keeping of a common or single temperature chart at the board 25 so that the temperature of each patient can be seen without reference to the individual charts heretofore used, eliminating in addition thereto much confusion and possibility of errors on part of the individual nurses. In this form the lead 18 may be interchangeable in sockets 26 in the tube or stem 17, said sockets positioned respectively in line with the different degrees. A heat of 100 degrees to 102 degrees indicates slight fever, 104 degrees indicates high fever, 106 degrees means great danger, and 107 degrees to 108 degrees usually indicates a fatal termination. A temperature (in adults) below 96 degrees indicates a condition of collapse, and if below 92 fatal results are almost inevitable. In view of the above, it is only proposed to permit of electrical connections being made to cover those degrees of temperature that would demand the presence of a physician.

While I have herein fully shown and described, and have pointed out in the appended claim certain novel features of constructions, arrangement, and operation which characterize my invention, it will be understood by those skilled in the art that various omissions, substitutions, and changes in the forms, proportions, sizes, and details of the device, of the materials used, and of their operation may be made without departing from my invention.

In a temperature alarm a thermometer having a mercury colmn, a plurality of sockets arranged in spaced relation in the said column and positioned respectfully in line with the different scale graduations of the thermometer, the said sockets being constructed of conducting material, an electric circuit having one of its terminals at all times in contact with the mercury in said column, and a plug on the other terminal of said circuit to be engaged selectively in the said spaced sockets in the mercury column.

Signed at New York, in the county of New York and State of New York, this 28th day of October, A. D. 1919.

STANLEY TOMMASELLO.